W. H. SAUNDERS.
CARRIAGE AXLE.
No. 11,179.   PATENTED JUNE 27, 1854.
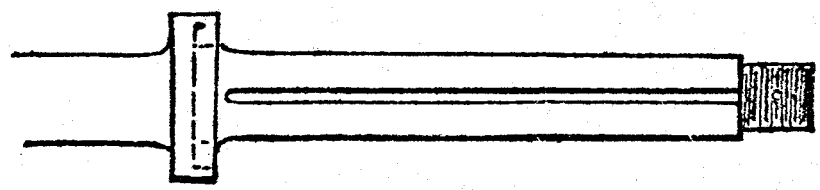
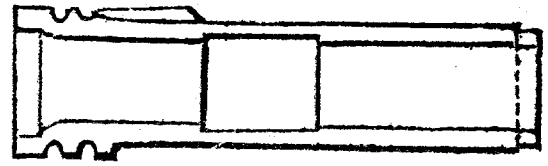
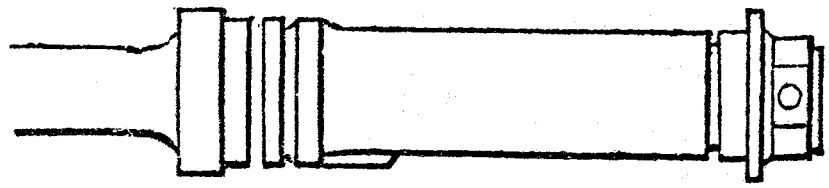
*Taken From Patent Office Report*
*1854 - Vol. II.*
*Only Drawing Accessible (1913)*

UNITED STATES PATENT OFFICE.

WILLIAM H. SAUNDERS, OF HASTINGS UPON HUDSON, NEW YORK.

CARRIAGE-AXLE.

Specification of Letters Patent No. 11,179, dated June 27, 1854.

*To all whom it may concern:*

Be it known that I, WILLIAM H. SAUNDERS, of Hastings upon Hudson, Westchester county, New York, have invented an Improvement in what is known as the "Taper-Axle" for Carriages, whereby the axle will be so strengthened that there will be no longer any danger of breakage, while one of the distinguishing advantages of the taper-box—namely, that of requiring so little wood to be cut out of the hub of the wheel will be fully preserved and also additional security be given for firmly fixing the axle-box in the hub of the wheel—and this consists in an enlargement or strengthening-piece of the turned part of such taper-axle at its root within or projecting beyond the usual groove of its collar and also in the ribs or grooves on the outside of the taper-axle box or the same box with cylindrical bearing, whereby it can be fixed, as aforesaid, more firmly in the hub of the wheel: and I do hereby declare that the following is a full, clear, and exact description of the construction and operation of the same, reference being had to the annexed drawing, making a part of this specification.

Figure A, a one inch taper or conical axle is commonly made. The collar is a ring of iron shrunk upon the bearing of the axle where it meets the square of the shaft.

Fig. B, an improved one inch taper axle, as now made. The collar is welded on this axle, and a groove cut in the collar upon the bearing of the axle, to receive a leather washer and also the large end of the axle box.

Fig. C, the same axle with the box and nut upon it, in place, as now made.

Fig. D, an improved one inch taper axle for which a patent is now claimed. The collar of this axle is enlarged so as to allow of a strengthening piece of iron being left around the bearing of the axle at its root (marked S in the drawing) which piece also admits of the angle, where the bearing meets the strengthening piece, being filled up so as to afford perfect security against danger of breaking. This addition to the axle requires a corresponding alteration in the box as will be shown afterward. The bearing of this axle may be either conical or cylindrical, but I prefer it to be taper or conical.

Fig. E, the same axle (D) with the box, as proposed to be made upon it, and the nut in place.

Fig. F, the improved axle box as now proposed to be made and patented. This box is enlarged at the end, to allow a recess (e), to correspond with and admit the strengthening piece S of the axle D. This enlargement of the end of the taper box and of the root of the taper axle are new and useful. This enlargement of the box end would forbid its being wedged securely into the hub of the wheel (which is essential,) unless some provision were made whereby the bearing for the wedges by which it is fastened in the hub should be elongated, I propose therefore to lay, upon the outside of the box, one or more ribs, with, or without, a groove or grooves between them, which will be found sufficient to allow of the box being securely fastened into the hub. The proposed improvements on this box distinguish it not only from all other taper boxes (by the enlargement or recess at the large end for the strengthening piece upon the axle), but also from what is now commonly known as the half patent box (marked Fig. H,) by dispensing with the needless internal flanch (marked a, a', a'', in Fig. H,) and the unnecessary oil chamber (marked b, b', in Fig. H,) whereby the diameter of the improved box is greatly reduced. One advantage of this reduction is, that much less wood has to be cut out of the hub of the wheel to admit the box. The hub is therefore left considerably stronger than when the half patent box is used and will be, of course, more durable than heretofore. d, is the end of the box bearing laterally against a leather washer contained in the groove of the collar of axle D. This bearing is intended to replace that against the internal flanch of the half patent box, which besides being unnecessary causes more than double the friction produced by the end bearing of the improved box as now proposed to be made.

Fig. G, section of taper box as now made.

Fig. H, a one inch half patent axle box showing the inner flanch a, a', a'', and oil chamber b, b', which uselessly increase the diameter of the large end of the box and weaken the hub of the wheel.

Fig. I, end view of large end of half patent box showing a, a', the inner flanch, b, b', oil chamber, c bearing or round part of axle, and *d*, end of box. The needlessly large diameter of this box becomes apparent, on comparing it with.

Fig. K, end view of improved axle box for which a patent is now claimed and which shows *d* the end of the box (on the same scale as Fig. I) *e, e'*, recess for strengthening piece at root of axle and *c* bearing for round part of axle.

Fig. L, end view of taper box, without enlargement, as now made and patented by the present petitioner.

Fig. M, front view of nut for axle.

Fig. N, back view of ditto, *a*, flanch, *b*, edge of ring to contain a leather washer, *c*, leather washer in place, *d*, screwed part of nut. Side views of this nut are shown in sixth place on axles C and E.

Having thus fully described the nature of my invention, I would state that I do not claim simply enlarging an axle at the root, as this has been done heretofore, but,

What I do claim as new, and desire to secure by Leters Patent, is—

The combination of a taper axle having an enlargement at the root, with a box having a similar inside enlargement at its rear and a diminution of size outside provided with concentric rings or grooves for allowing it to be wedged in the hub, the whole being for the purpose of strengthening the axle without enlarging the box, and enabling me to use smaller hubs with a sufficiency of wood therein to preserve the necessary strength, substantially as represented.

W. H. SAUNDERS.

Witnesses:
  CHARLES EDWARDS,
  THOS. HINWOOD.